(12) United States Patent
Sakirov (10) Patent No.: US 8,025,303 B2
(45) Date of Patent: Sep. 27, 2011

(54) BICYCLE EQUIPPED WITH A CHAINSET/CRANK-ARM SYSTEM

(76) Inventor: Pavel-Tivadar Sakirov, Paris (FR)

(*) Notice: Subject to any disclaimer, the term of this patent is extended or adjusted under 35 U.S.C. 154(b) by 0 days.

(21) Appl. No.: 12/225,674

(22) PCT Filed: Mar. 27, 2007

(86) PCT No.: PCT/FR2007/000529
§ 371 (c)(1),
(2), (4) Date: May 5, 2009

(87) PCT Pub. No.: WO2007/110513
PCT Pub. Date: Oct. 4, 2007

(65) Prior Publication Data
US 2009/0224506 A1    Sep. 10, 2009

(30) Foreign Application Priority Data
Mar. 27, 2006 (FR) .................................. 06 02650

(51) Int. Cl.
*B62M 1/00* (2010.01)
(52) U.S. Cl. ........................................ 280/253; 280/252
(58) Field of Classification Search ........... 280/252–257
See application file for complete search history.

(56) References Cited

U.S. PATENT DOCUMENTS

| 416,016 | A | * | 11/1889 | Schrader ........................ 74/134 |
| 608,674 | A |  | 8/1898 | Harshner |
| 1,505,271 | A |  | 8/1924 | McNeil |
| 2,383,000 | A |  | 8/1945 | McLean |
| 4,561,318 | A | * | 12/1985 | Schirrmacher ................... 74/54 |
| 4,561,668 | A |  | 12/1985 | Klopfenstein |
| 4,564,206 | A | * | 1/1986 | Lenhardt ........................ 280/252 |
| 4,666,173 | A |  | 5/1987 | Graham |
| 5,403,027 | A |  | 4/1995 | Hwang |
| 5,405,157 | A | * | 4/1995 | Bezerra et al. ................. 280/253 |
| 7,600,771 | B2 | * | 10/2009 | Miller et al. ................... 280/252 |
| 2007/0228687 | A1 | * | 10/2007 | Parker ............................ 280/252 |
| 2008/0054589 | A1 | * | 3/2008 | Scarborough ................. 280/254 |

FOREIGN PATENT DOCUMENTS

| DE | 54968 | 2/1890 |
| DE | 101 25 645 A1 | 12/2001 |
| FR | 415 887 | 10/1910 |
| FR | 2 382 368 | 9/1978 |
| FR | 2 726 532 | 5/1996 |
| WO | WO 02/30732 A1 | 4/2002 |

* cited by examiner

*Primary Examiner* — Tony H. Winner
(74) *Attorney, Agent, or Firm* — Blakely, Sokoloff, Taylor & Zafman (57) ABSTRACT

A device for assembling a bicycle equipped with a pedal crank system to improve the mechanics of the kinetic energy put in by the rider by simplifying the movement of the rider's feet into a reciprocating up and down movement. It consists of right and left cranksets (1D, 1G) pivoting about the axis (Ex) of the shafts (2), a chainset which includes a rack (3) that propels the ring gear (4) and the set of ring gears and chains (5, 6) by transforming the play forces through a rear changer (7) and moves forward the rear wheel via its hub receiving the propelling force of the play of the hubs of the cassettes (8) integrated in the hub of the wheel (9), or external with a system of one-way freewheel (8), fixed on the rear fork (12) by the rotating pin (Ax) also maintaining the wheel fastener (25).

5 Claims, 9 Drawing Sheets

BICYCLE EQUIPPED WITH A CHAINSET/CRANK-ARM SYSTEM

The present patent application is a Utility claiming the benefit of Application No. PCT/FR2007/000529, filed Mar. 27, 2007.

BACKGROUND OF THE INVENTION

This present invention concerns a new type of two-wheeled vehicle equipped with a pedal-crank system that is propelled by the feet of the rider, and which transforms reciprocal vertical alternating movement in translation into a unidirectional rotational movement.

The conventional two-wheeled vehicles, known as bicycles, propelled by the rider, are not efficient for use by the general public, in particular because they are not "propellable" at high speed, and are uncomfortable when pedalling uphill on steep slopes.

BRIEF SUMMARY OF THE INVENTION

This new bicycle allows one to achieve better performance with the same force employed as that used in a conventional bicycle.

This two-wheeled vehicle is equipped with a pedalling system that allows one to transmit a greater moment of force by virtue of the increased length of the pedal crank and rack of the chainset.

BRIEF DESCRIPTION OF THE DRAWINGS

FIGS. 1-6 show a first embodiment of the invented bicycle in which transmission of the forces generated by the feet of the rider is achieved by means of a rack and transmission ring gears installed in several diameters.

DETAILED DESCRIPTION OF THE INVENTION

Transmission of the forces generated by the feet of the rider by pushing vertically downwards on one of the pedal of the bicycle (FIGS. 1, 2, 3, 4, 5, 6), is achieved by means of a rack (3) fixed onto these pedal crank set (1D for the right pedal-crank set, 1G for the left pedal-crank set), and operates the pinion (4) fixed onto the rotating axis of the chainring (5), causing the rear wheel (25) to advance by means of a link of a chain (6) to the cog cassette (8) of the rear wheel.

In order to ensure that the pedal-crank set (1D, 1G) are able to describe a reciprocating vertical alternating movement, and that a pedal is always accessible at the top for a foot thrust by the rider without the rider being obliged to push back the pedal, thereby executing two controlled muscular efforts, a differential case device with several conical or non-conical pinions (15) has been provided. For example, when the left pedal rises, obliging its differential pinion to turn toward the rear, the differential pinion receivers cause the right pedal to descend by its own differential pinions which have become sensors, and then vice versa continuously. In order to propel the bicycle in the pedal crank arms-connecting-rod solution, in which the differential case device is not present, the rider must start the sequence by pressing on the pedal located nearest to the top (in FIGS. 8, 9, 10 and 11, it is the left pedal).

The more the length of the pedal crank arms (1D, 1G) increases, the greater the development allows one to cope with steeper slopes.

According to particular embodiments of this two-wheeled vehicle propelled by the rider:

the rack (3) can be replaced by a system of connecting-rod crank (FIGS. 8, 9, 10, 11) to transform the reciprocating vertical movement in translation into a rotational movement.

This system includes an intermediate connecting-rod pivoting on an axis (Dx) located on the pedal crank arm (18), and a second connecting-rod (17) turning with the ring gears around the central axis (Cx) of the chainring (5). The intermediate pivoting connecting-rod and the connecting-rod of the chainring articulate (18) freely on a axis (Bx), which is able to turn without causing any propulsion toward the rear, by virtue of the unidirectional freewheel system in the hub cassette. This possible technical transmission solution allows one to reciprocally push back the pedal that is already located at the bottom, and after a turn of the ring gear toward the front, located at the top without needing to install a differential case system with several conical or non-conical pinions, according to FIG. 1 and FIG. 2.

In order to offer the user a wide margin in the choice of speeds designed for maximum convenience on this vehicle with rack/crank/pedal (FIGS. 1, 2, 3, 4) or connecting-rod/crank/pedal propelled by the rider during his muscular efforts, the transmission ring gears can be installed in several diameters (5) and with several numbers of teeth in order to obtain several speeds using a derailleur assembly.

For the technical solution by propulsion with connecting-rod/crank/pedal, the receiving connecting-rod (19) can be equipped with an adjustable extension device to allow the length of the latter to be increased or decreased, and replacement of the different diameters of the chainrings which are used to change the speeds. By increasing or decreasing the length of this connecting-rod, distances between the axis of rotation change, and the momenta of force can be altered. By increasing the length of the chainring connecting-rod, the energy put into the propulsion also increases by virtue of the momentum of force. By reducing this distance, propulsion at high speed is possible by moving the pedal less rapidly.

The length of the vertical movements of the connecting-rod/pedal-crank arms (1D, 1G) is bounded by the distance between the rotating axes of these two parts of the mechanism (17, 19) and also the distance between the central axis (Ex) of the connecting-rods/pedal crank arms and the central axis of rotation of the ring gear (Cx).

The frame of this bicycle is composed of two separate parts:

the front part with the steering assembly and the fork (possibly telescopic), with the whole forming an assembly with the frame which can be in a single unit (21, 22, 23);

the second part includes the rear fork (11), the top tube of the rear frame (14) which includes the horizontal axis (Cx), the differential case device (15) to ensure reciprocity of the vertical movements of the pedals, and the reinforcing fork (12) which takes up the high stresses coming from the top tube of the rear frame, distributing the forces to the fixing centre of the rear wheel.

The whole of the single-unit front frame (21, 22, 23) and the rear frame can be joined at the intermediate axis (Fx). The latter can pivot horizontally, by including the shock-absorber system assembled with the technical assembly method known as "split heads". The pivot head (20) of the main rear frame is dimensioned so that the head of the single-unit frame inserts into it. To this end, either the main head is a single-unit and the secondary head can be dismantled, or the main head can be dismantled into two parts and the secondary head is a single-unit. These solutions allow the use of an assembly of different frames with a given main part. For example, it is possible to change the main frame or the single-unit front frame in order to obtain another (multi-assembly) type of bicycle.

The horizontal tube includes two independent transmission hub systems, which are linked to the chainring, and used to propel the ring gears toward the front (13 or 13BIS). The principle of this mechanism is applied in two directions: when one of the two racks rises by virtue of the differential case device of the pinions (15) built into the central rotating-pivoting axis (Ex) of the pedal-crank set, the other pedal-crank set is loaded by the force from the bicycle user, and propels the chainrings toward the front. The rising rack causes the unidirectional freewheel transmission set (13 or 13BIS) to turn in the reverse direction, and therefore plays no part in the propulsion by turning in the other direction. At the chainring, the unidirectional freewheel system acts in the same way when the corresponding rack causes it to turn toward the rear. In FIG. 1, FIG. 2, FIG. 3, and FIG. 4, the right pedal is in up position. By descending, the pedal of the right rack propels the pinion of the chainring, with the whole of the chain and the transmission hub of the rear wheel. At the same time, the left pedal rises, and causes the unidirectional freewheel system to turn in the reverse direction.

In order to prevent the rack cranks from detaching from the pinion (4) of the ring gears, and in order to limit the trajectory of the pedal crank arm, an anti-rotation braking device has been incorporated into the differential case device of the pinions (15). The braking occurs from a certain limit of slope of the pedal crank arm with specially positioned teeth on the pinions.

For one particular embodiment, in order to avoid the differential case device of the pinions, the pedal crank arm can be made with a connecting-rod/crank system as follows: the connecting-rods of the ring gear (19) are fixed to the chainring (5), and propelled around axis Bx (articulated link) (18) by means of the intermediate connecting-rod (17) that pivots around the axis of the articulation unit (16).

The connecting-rod/crank pedal-crank set solution is not equipped with unidirectional freewheel transmissions at the chainring. The latter is able to turn freely around its axis toward the front and the rear. The only unidirectional-freewheel transmission is incorporated into the cog cassette (8) allowing propulsion toward the front only.

The whole of the rear frame carrying the propulsion systems pivots around axis Fx, using a shock-absorber system that is incorporated into the frame head (20) or an outside shock-absorber system fixed onto the frame part. The front frame is assembled to include the single-unit (21) and rotating axis Gx, or the front fork (22) with the shock-absorber and the front wheel (24) turning to determine the movement direction of the bicycle.

As a variant, the rack and pinion propulsion system can be created by replacing the rack 3 by a chain fixed onto the pedal crank arms.

Figure 1:
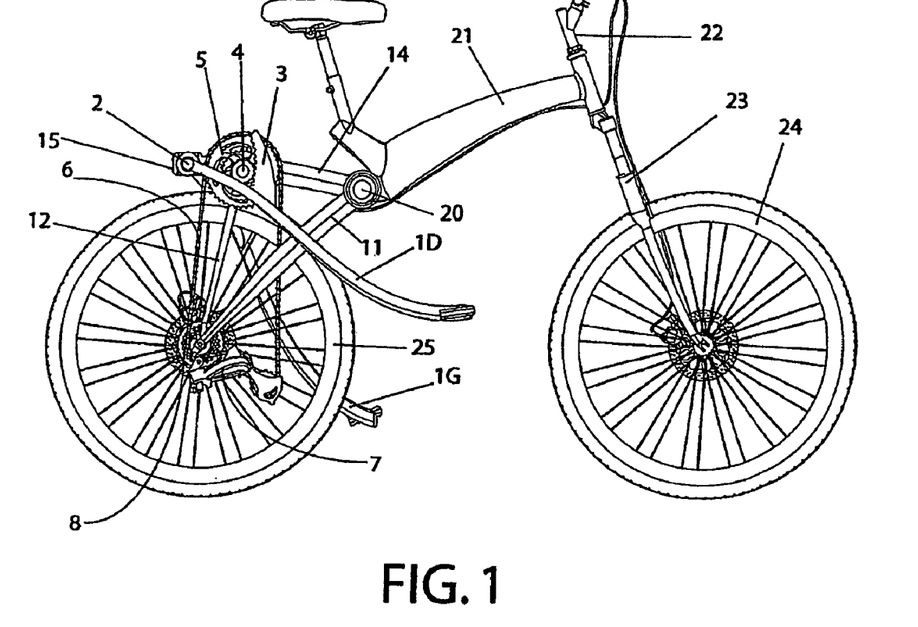
Figure 2:
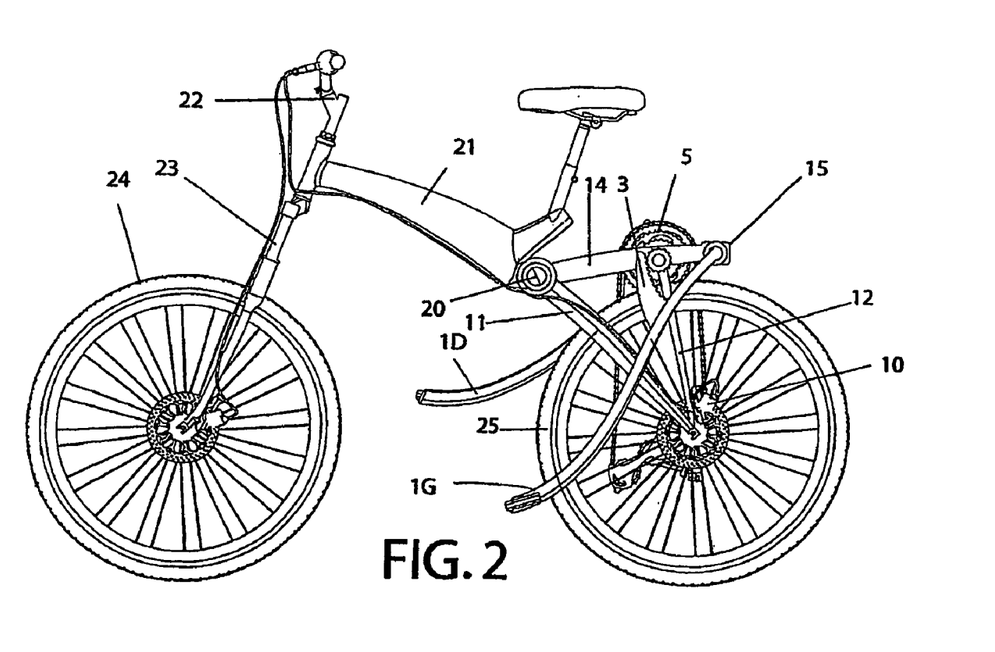
Figure 3:
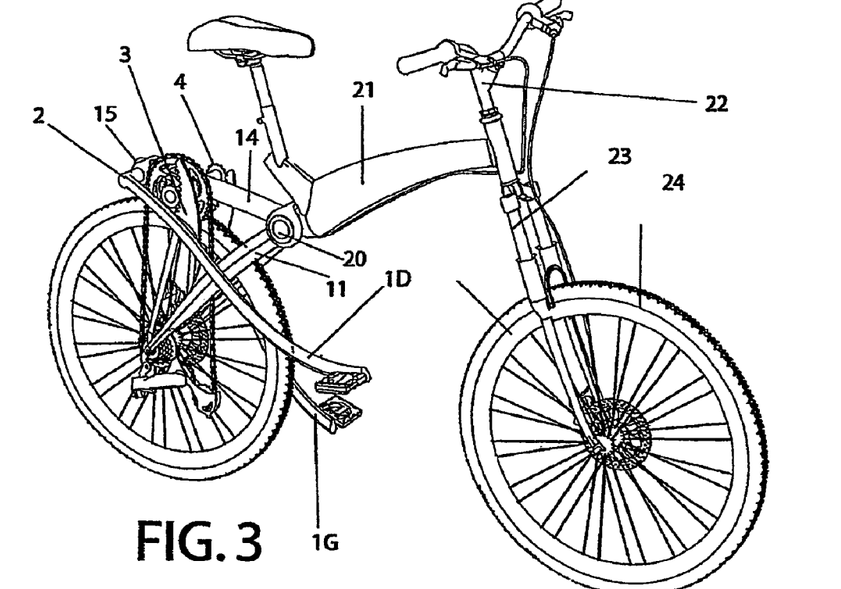
Figure 4:
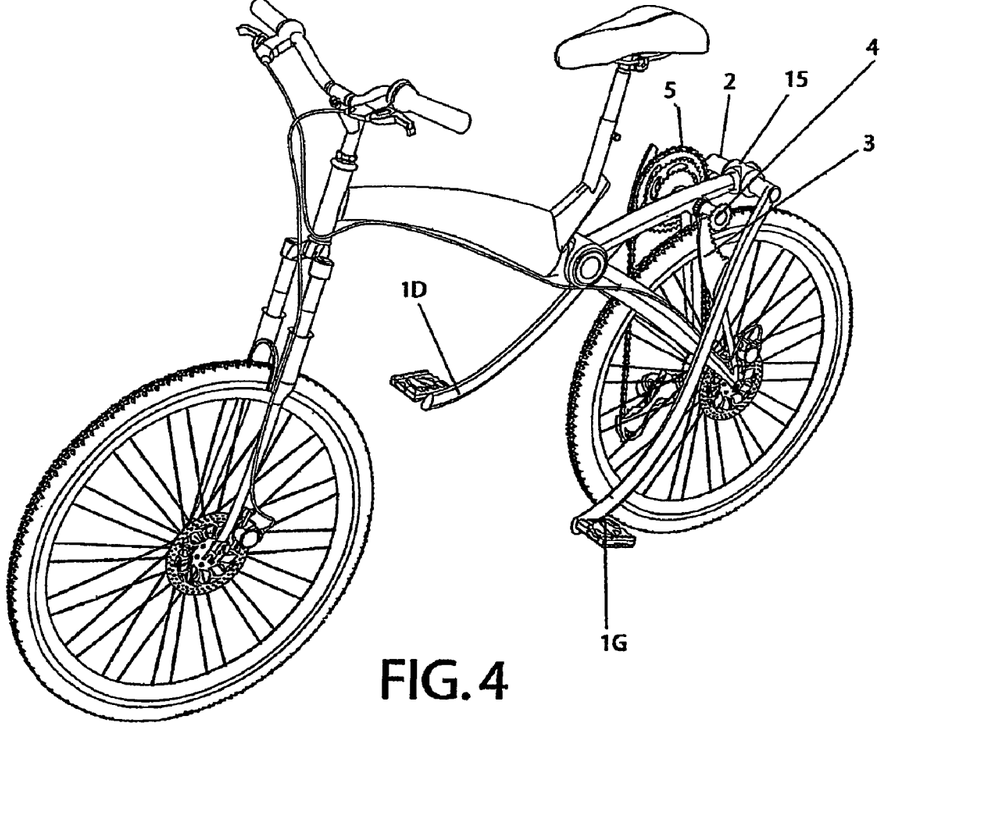
Figure 5:
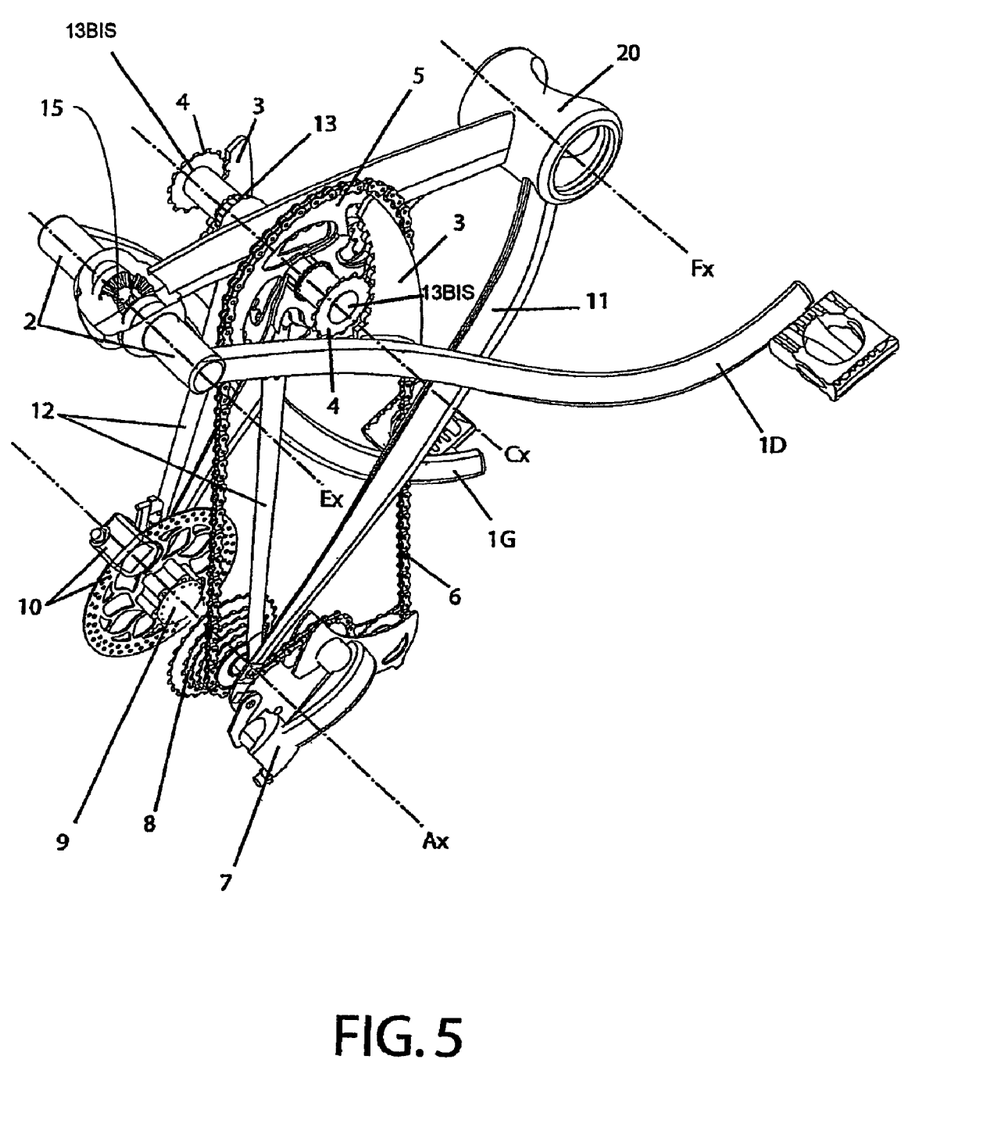
Figure 6:
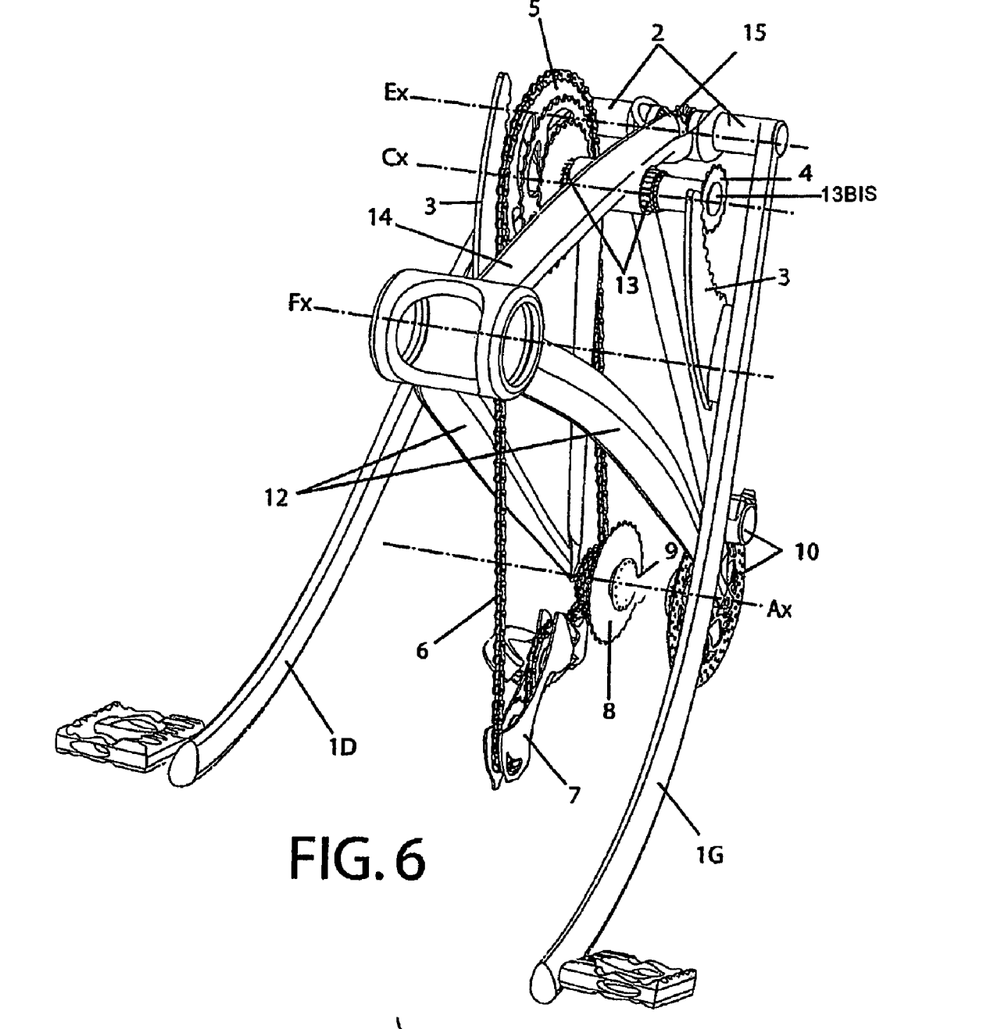
FIG. 6 is a detailed view illustrating the connecting-rod/pedal/crank arms.
Figure 7:
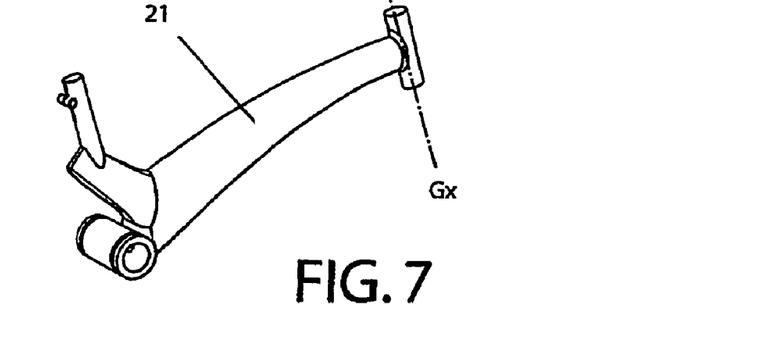
FIG. 7 is a detailed view of a single unit front frame.
Figure 8:
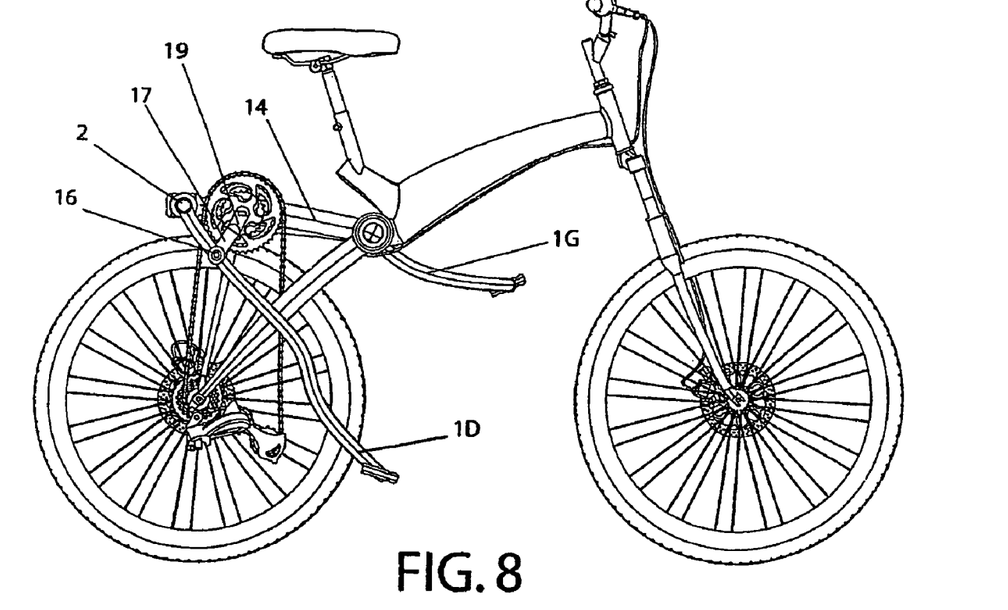
FIGS. 8 and 9 illustrate an alternate embodiment in which the rack is replaced by a system of a connecting rod and a pedal crank arm.
Figure 9:
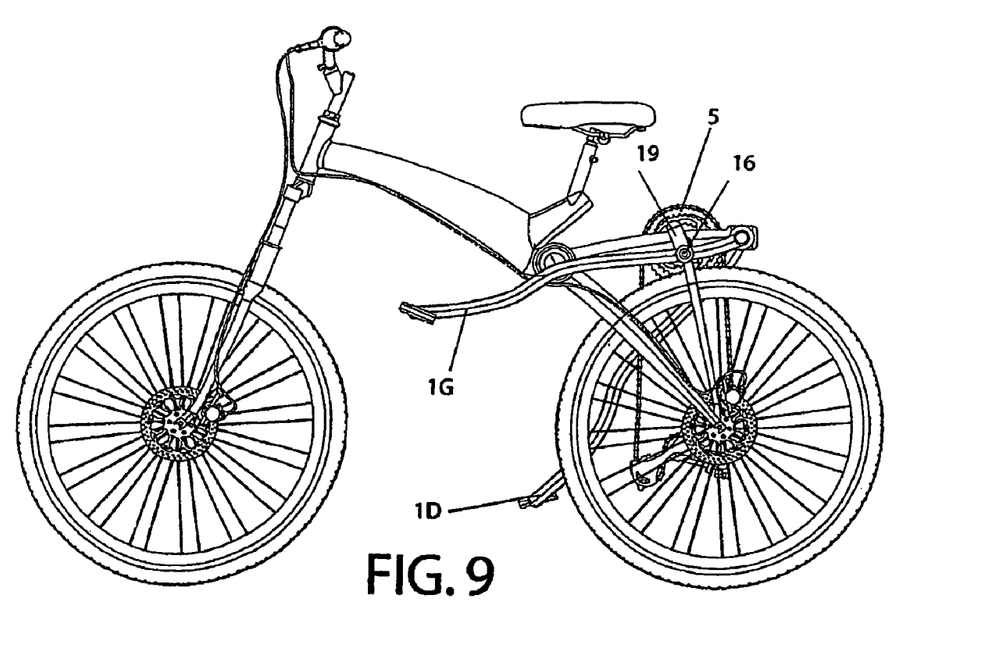
Figure 10:
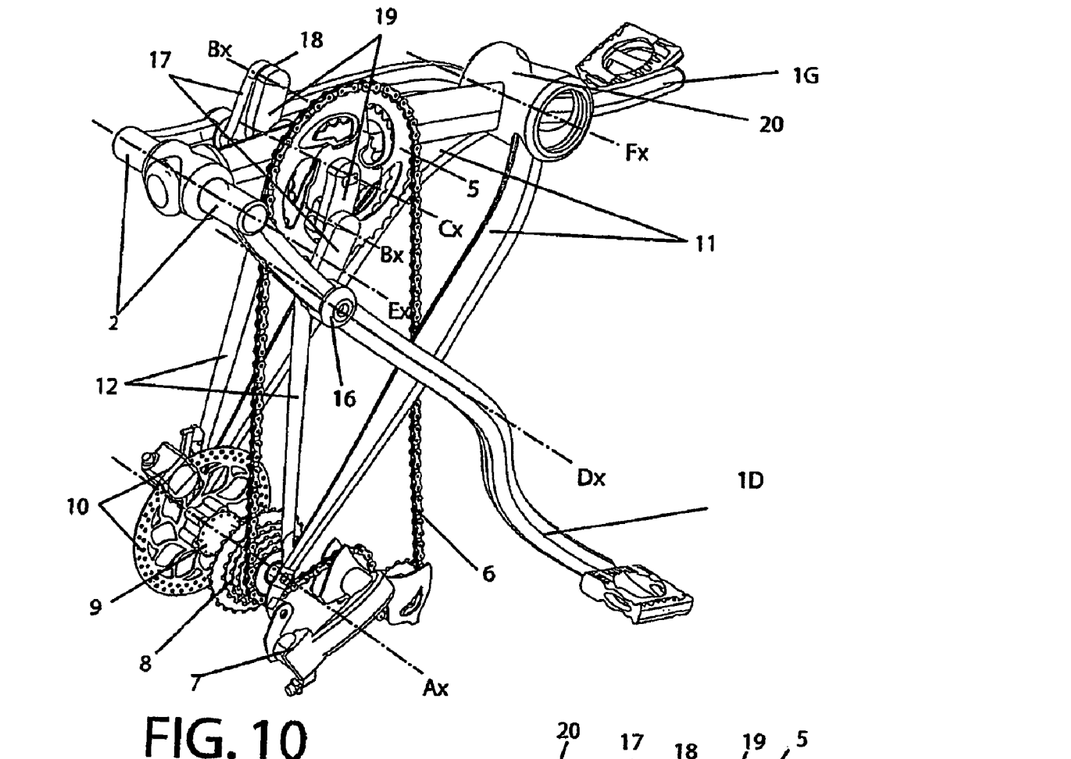
FIGS. 10 and 11 are detailed views showing the embodiment illustrated in FIGS. 8 and 9.
Figure 11:
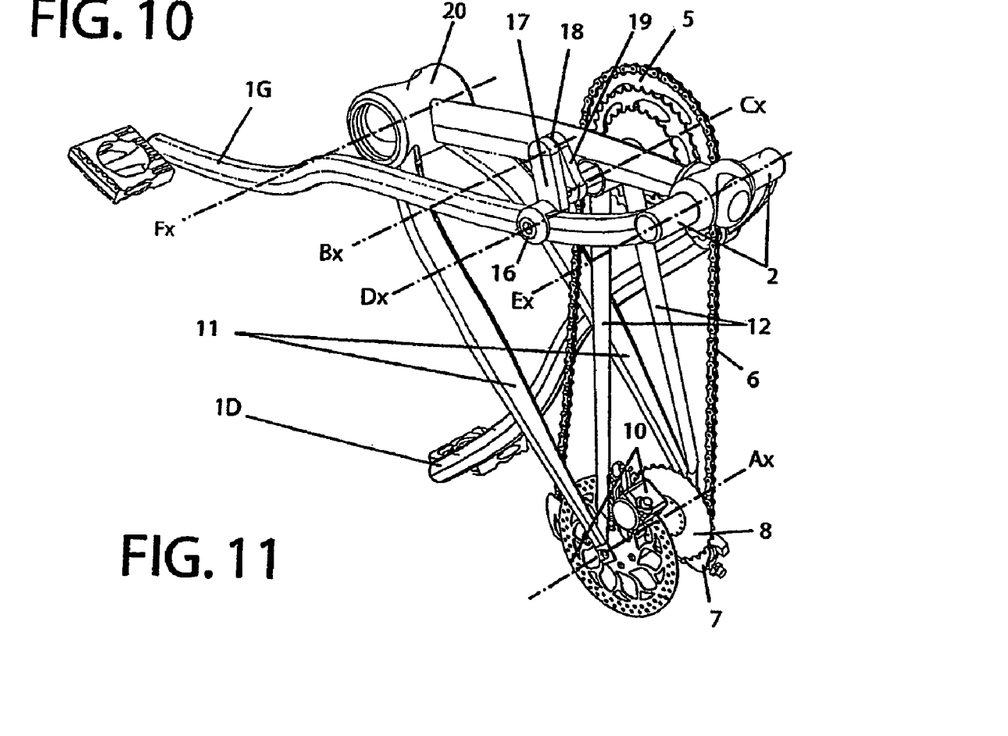
Figure 12:
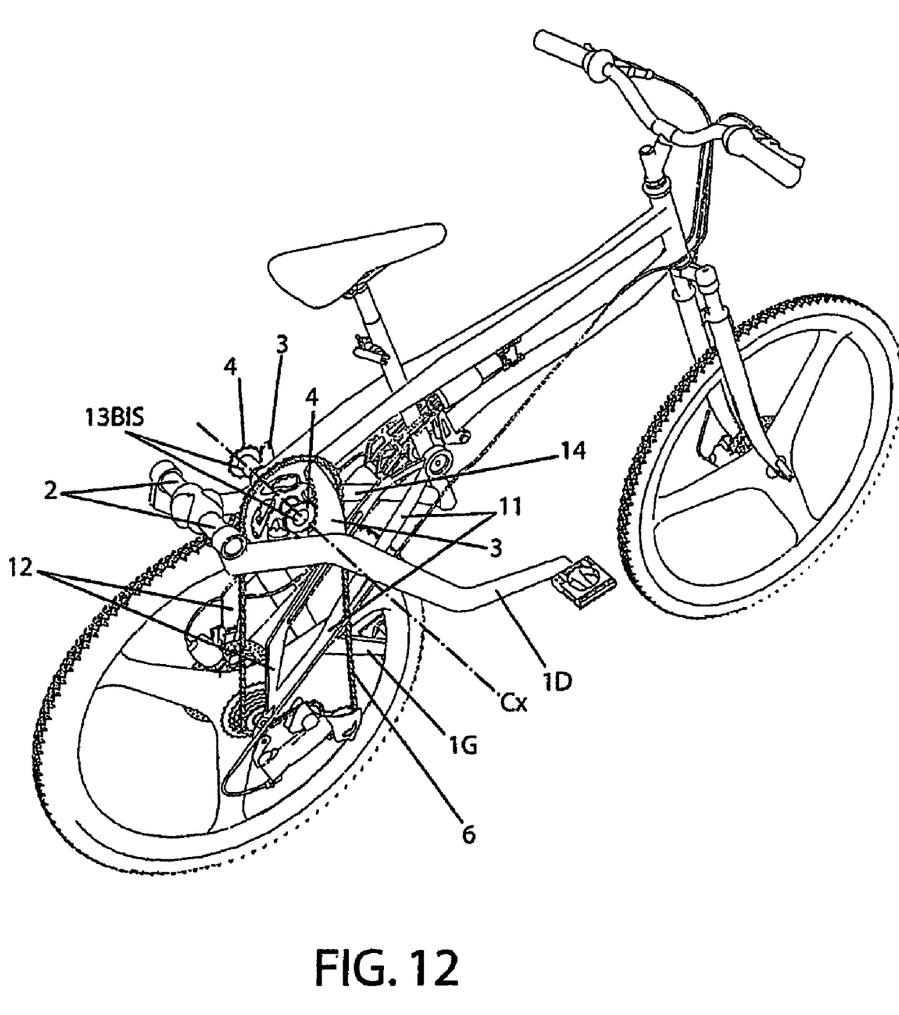
FIG. 12 is a perspective view of the first embodiment.
Figure 13:
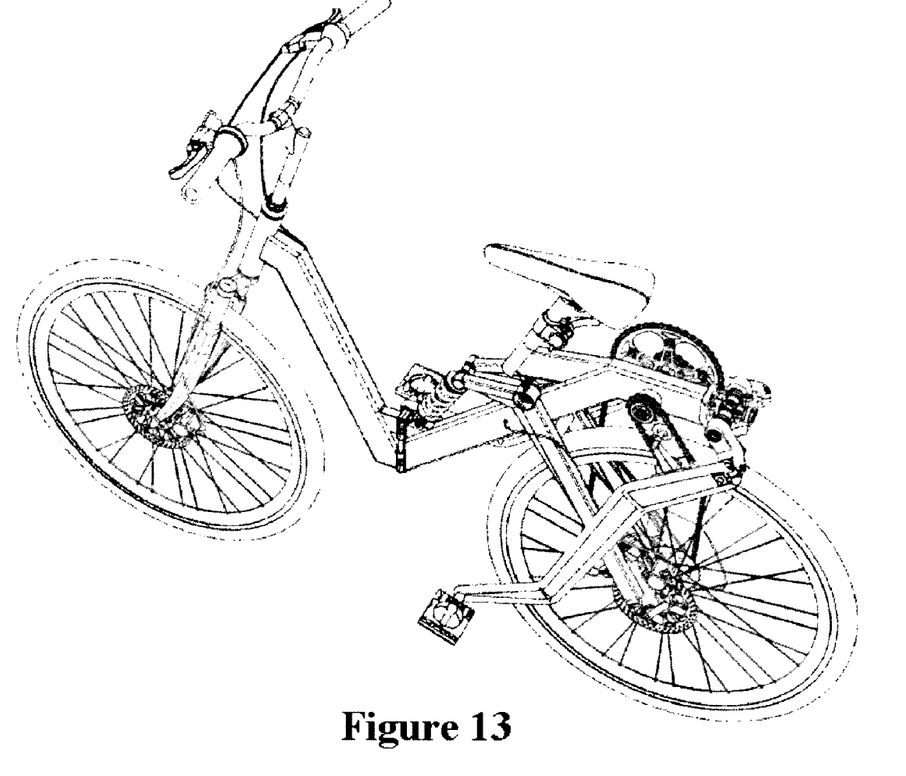
FIGS. 13 and 14 are perspective views showing chains connected to pedal crank arms.
Figure 14:
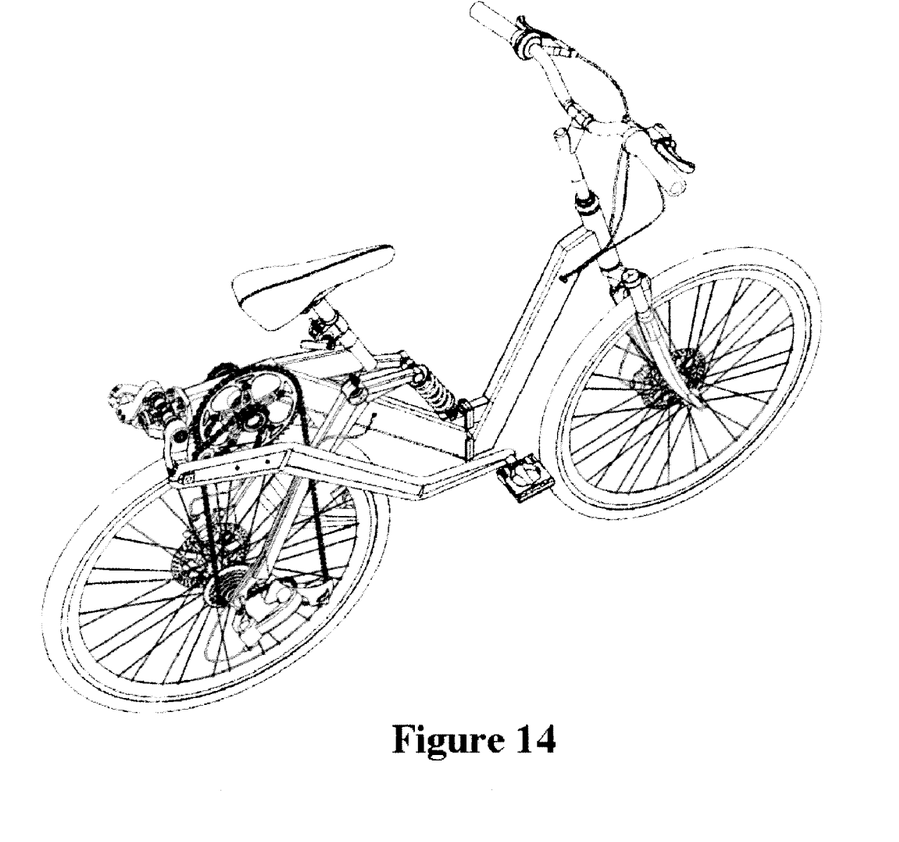

FIGS. 13-14 show several embodiments of the invention by way of example and should not be construed as limiting the invention. Accordingly, the figures are illustrative and not limiting.

The invention claimed is:

1. A transmission system for a cycle comprising:
   a front frame that includes a frame head;
   a rear fork mounted on the frame head;
   a rear-frame top tube fixed onto the frame head and including a first axis Cx, transverse to the rear-frame top tube;
   one or more chainrings mounted to rotate on the first axis Cx transverse to the rear-frame top tube;
   two shafts, each having one end mounted on one end of the rear-frame top tube;
   pedal crank arms articulated at the other ends of the shafts that are not mounted to the rear-frame top tube;
   a chain intended to transmit power between a chainring and a cog cassette mounted on a rear wheel; and
   a coupling device between the pedal crank arms and the first axis Cx, transverse to the rear-frame top tube, to convert an alternating movement of the pedal crank arms into a rotational movement of the chainring transmitted to the rear wheel by means of the chain and the cog cassette.

2. The transmission system of claim 1, wherein the coupling device includes:
   two racks fixed respectively on one of the pedal crank arms and mating with a pinion ring gear linked in rotation around the first axis Cx transverse to the rear-frame top tube with the chainring by means of a freewheel system that can be placed in the pinion gear of the associated ring gear,
   a differential system arranged at the rear of the tube so as to ensure reciprocity of the vertical movements of the pedal crank arms.

3. The transmission system of claim 1, wherein the coupling is formed of:
   two first connecting-rods articulated respectively on the pedal crank arms (around an axis (Dx) by means of an articulation unit,
   two second connecting-rods, articulated at one end in relation to the first connecting-rods around an axis (Bx), the second end of which drives the chainring in rotation around the first axis Cx.

4. The transmission system of claim 1, wherein the frame head houses a shock-absorber device.

5. The transmission system of claim 1, wherein the coupling includes:
   two chains fixed respectively on one of the pedal crank arms and mating with a pinion ring gear linked in rotation around the axis Cx, transverse to the rear frame top tube with the chainring by means of a respective freewheel system that can be placed in the pinions of the associated ring gears;
   a differential system arranged at a rear of the tube so as to ensure reciprocity of the vertical movements of the pedal crank arms.

\* \* \* \* \*

UNITED STATES PATENT AND TRADEMARK OFFICE
CERTIFICATE OF CORRECTION

PATENT NO.         : 8,025,303 B2
APPLICATION NO.    : 12/225674
DATED              : September 27, 2011
INVENTOR(S)        : Pavel-Tivadar Sakirov It is certified that error appears in the above-identified patent and that said Letters Patent is hereby corrected as shown below:

In the Claims, Column 4, Claim 3, line 42, please delete "(around" and insert --around--.

Signed and Sealed this
Sixth Day of March, 2012

David J. Kappos
*Director of the United States Patent and Trademark Office*